(12) United States Patent
Hassell et al.

(10) Patent No.: US 8,016,921 B2
(45) Date of Patent: Sep. 13, 2011

(54) AIR VENT FILTER AND FRESHENER CONTAINER

(76) Inventors: Chad Ross Hassell, Draper, UT (US); David F. Broadbent, Salt Lake City, UT (US)

( * ) Notice: Subject to any disclaimer, the term of this patent is extended or adjusted under 35 U.S.C. 154(b) by 544 days.

(21) Appl. No.: 12/268,353

(22) Filed: Nov. 10, 2008

(65) Prior Publication Data

US 2009/0120291 A1     May 14, 2009

Related U.S. Application Data

(60) Provisional application No. 60/987,035, filed on Nov. 10, 2007.

(51) Int. Cl.
*B01D 46/00* (2006.01)
(52) U.S. Cl. ............... 95/273; 55/497; 55/496; 55/356; 55/DIG. 35; 96/17; 96/66; 96/69
(58) Field of Classification Search ............ 55/497, 55/496, 356, DIG. 35; 95/273; 96/17, 66, 96/69
See application file for complete search history.

(56) References Cited

U.S. PATENT DOCUMENTS

| | | | |
|---|---|---|---|
| 3,203,338 A * | 8/1965 | Dry | ............... 454/318 |
| 5,597,392 A | 1/1997 | Hawkins et al. | |
| 5,690,719 A | 11/1997 | Hodge | |
| D392,031 S | 3/1998 | Miller | |

* cited by examiner

*Primary Examiner* — Jason M Greene
*Assistant Examiner* — Dung H Bui

(57) ABSTRACT

An assembly of structural components for supporting an air filtration member is disclosed. The assembly may include an air filtration member and a framework designed to provide support to the filtration member. The framework may include a first structural component forming a lower base of the framework for supporting the filtration member and a second structural component forming an upper base of the framework for supporting the filtration member. The framework may also have an arm that is slidable within and attachable to the framework, and may be configured to provide an adjustment mechanism for the framework, such that the framework and the filtration member can be located within a number of differently sized forced air heating or air conditioning ducts.

20 Claims, 5 Drawing Sheets

FIGURE 1
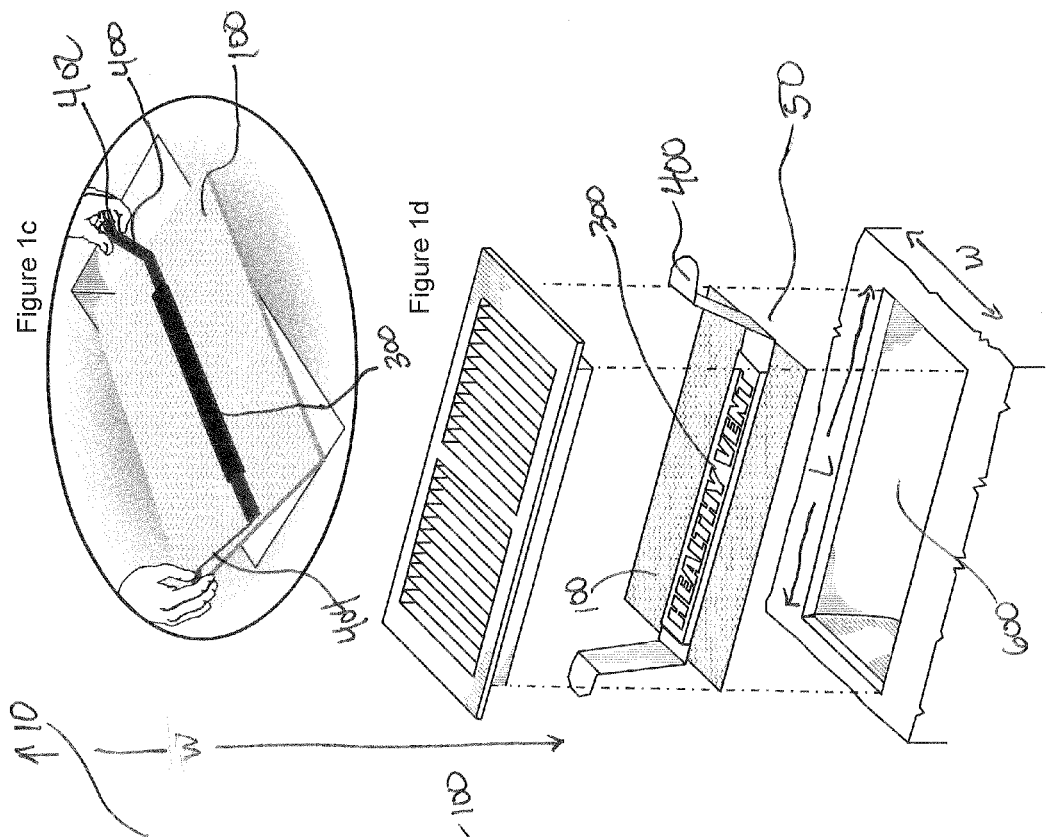
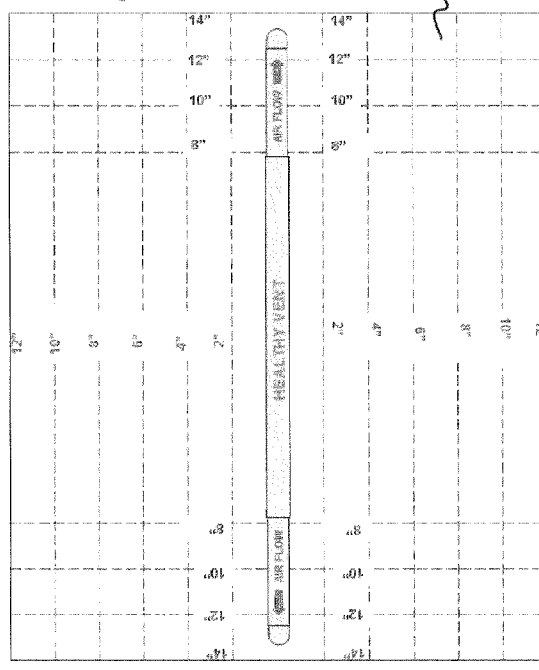
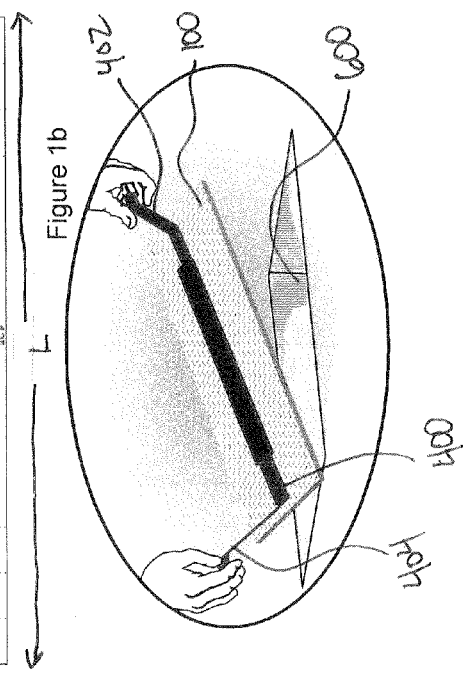
Figure 1a - shows Part E, the fully assembled Air Vent Filtration System

AIR VENT FILTER AND FRESHENER CONTAINER

CROSS-REFERENCE TO RELATED APPLICATIONS

This application claims the benefit of U.S. Provisional Application No. 60/987,035, filed Nov. 10, 2007, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

The disclosure relates generally to air filters and air fresheners, and more particularly, but not necessarily entirely, to an air filter and air freshener container for use with any number of heating vents and air conditioning vents used in homes and commercial buildings.

Conventional forced air heating and air conditioning systems typically provide for some amount of air filtering. Such systems often employ an apparatus for filtering air at a location that is near or at the air handler or air circulating fan of the system. In such a filtering apparatus, the area of the filter material is typically limited by the cross sectional area of the ventilation duct that the filter is disposed in for filtering air. Usually, a large sheet of filter material is used. Further, while such filters are useful, they do not fully filter the air, especially between the fan and the vent exit, where the vent opens into a room where bacteria and other organisms may be present.

A need exists for an air filtering and freshening system that can be used at a point in the system where air is leaving the ventilation system, i.e., at the air duct exit, and that can be used in addition to the conventional filters at the air handler or air circulating fan portion of the system. A need exists for a removable, adjustable and disposable filtering and freshening device that is easily accessible and used with any ventilation duct and that can be universally inserted into any given duct no matter its size. Because such a device is in nearly constant use, it should be relatively inexpensive to manufacture thereby making the device disposable to provide more effective filtering than conventional furnace mounted filters used alone. The filter device should be adjustable to any duct exit and allow for maximum airflow through the filtering element to permit proper operation and maximum filtering efficiency. The device may optionally dispense scented particles into the air for a pleasant aroma.

It is noteworthy that devices known to applicant do not provide an effective and efficient filter device that is universal in nature and can be easily inserted into any air duct exit. There is a long felt, but currently unmet, need for a disposable air filter device as shown and described in the following specification.

The devices known to applicant are characterized by several disadvantages that may be addressed by the disclosure. The disclosure minimizes, and in some aspects eliminates, the failures in devices known to applicant, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIGS. 1-5 illustrate an embodiment of an air vent filter and freshener container in accordance with the principles of the disclosure.

DETAILED DESCRIPTION

Figure 2:
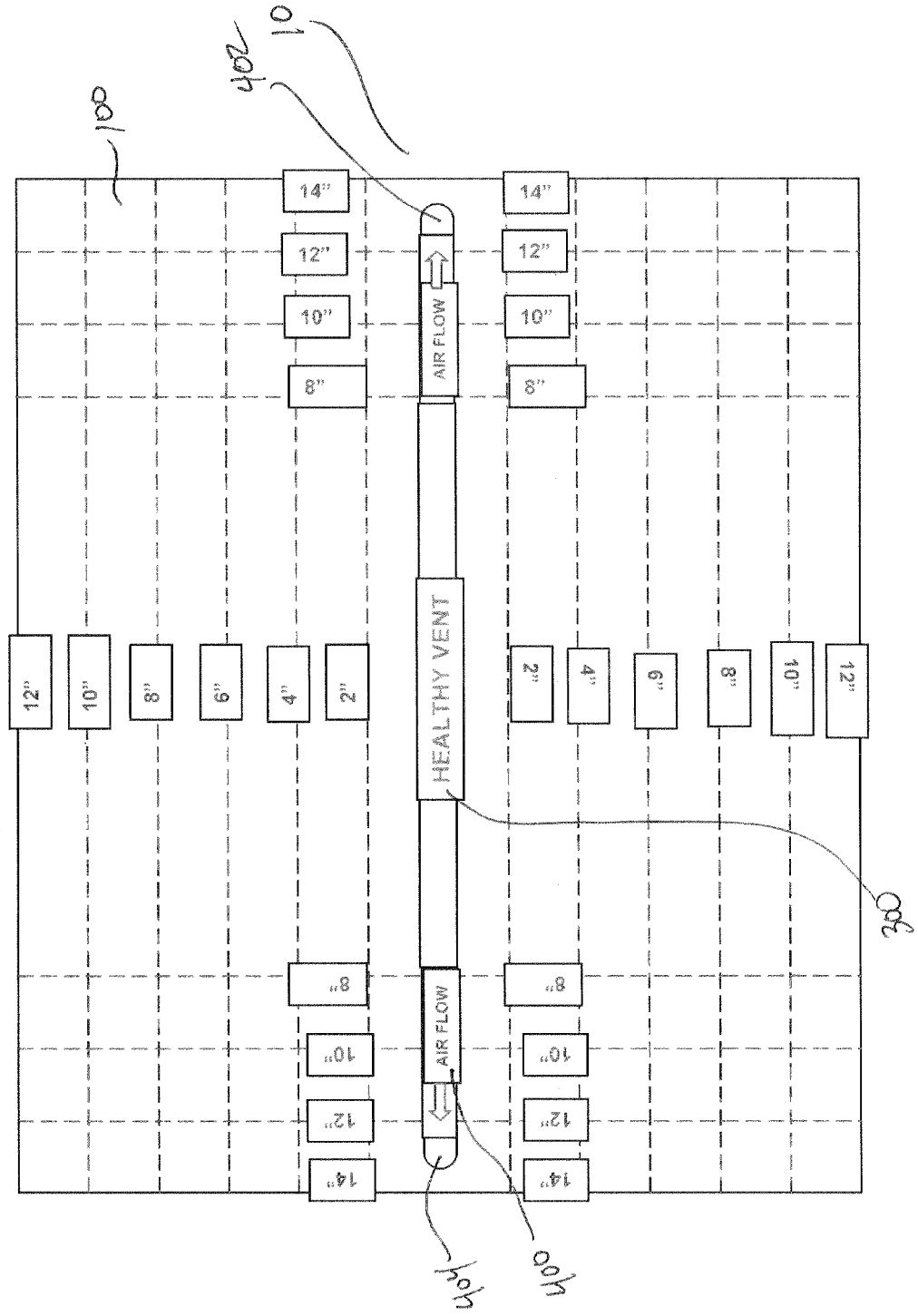

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure and methods of the disclosure are described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

It must be noted that, as used in this specification and the appended claims, the singular forms "a," "an," and "the" include plural referents unless the context clearly dictates otherwise.

In describing and claiming the subject matter of the disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The device of the disclosure may comprise an air vent filter framework that is configured and dimensioned to fit into an air conditioning or heating system ventilation duct opening with a mechanical support structure to which an air particulate filter and an optional air freshener may be attached and supported. The vent register sleeve framework, scent dispenser and air filter insert may be embodied in a single component and located in a forced air heating and/or cooling system duct opening, and may fit just inside the duct outlet through a floor, wall or ceiling opening. The air filter element and optional air freshener may be attached to the vent register sleeve framework. The unique framework system is able to support a commercial air filtration media with an appropriate MERV rating for various applications. The filter framework contains structure allowing it to slide open to provide support for any size filter media required for various sizes of air vent ductwork registers creating a one size fits all type universal air filtration system for all sizes of forced air vents.

An embodiment of the assembled filtration system 10 is illustrated in FIG. 1 and will now be discussed in more detail. FIG. 1a illustrates the fully assembled air vent filtration system 10, which may comprise a ventilation member 100 that may be manufactured from any filtration media known. The filtration member 100 may be adjusted in terms of its length "L" and its width "W" in order to fit into a variety of differently sized vent register openings 600 (shown best in FIG. 1d).

The air vent filtration system 10 may further comprise a framework that may include a first structural component 200 (illustrated best in FIG. 3), a second structural component 300 and an arm 400, which may also be a plurality of arms 400. The second structural component 300 may comprise an upper base support member 310 and a box frame 320. FIGS. 1b and 1c illustrate the use of the arm 400—Part C, which may comprise sliding arms 402, 404 to adjust the overall support framework 50. The slidability of the sliding arms 402, 404 may permit the entire framework to be adjusted to various sizes of vent ducts and to insert a vent filter 100 into a typical vent duct unit. FIG. 1d illustrates how the building's vent duct 600, the vent filter structure and framework 50 and the standard vent filter 100 fit together in normal use.

FIG. 2 shows a two dimensional front view of the assembled air vent filter mechanism 10 folded into its shipping position with a 12" by 14" filter member 100 and the second component 300 of the adjustable support structure 10 and bendable sliding arms 402, 404. The sliding arms 402, 404 may comprise end tabs 410, 412 that may be extended upward around the register base to hang on the edge of the floor, wall or ceiling when the air vent filter mechanism 10 is in use to hold the entire framework 50 in place within the air duct opening 600.

Figure 3:
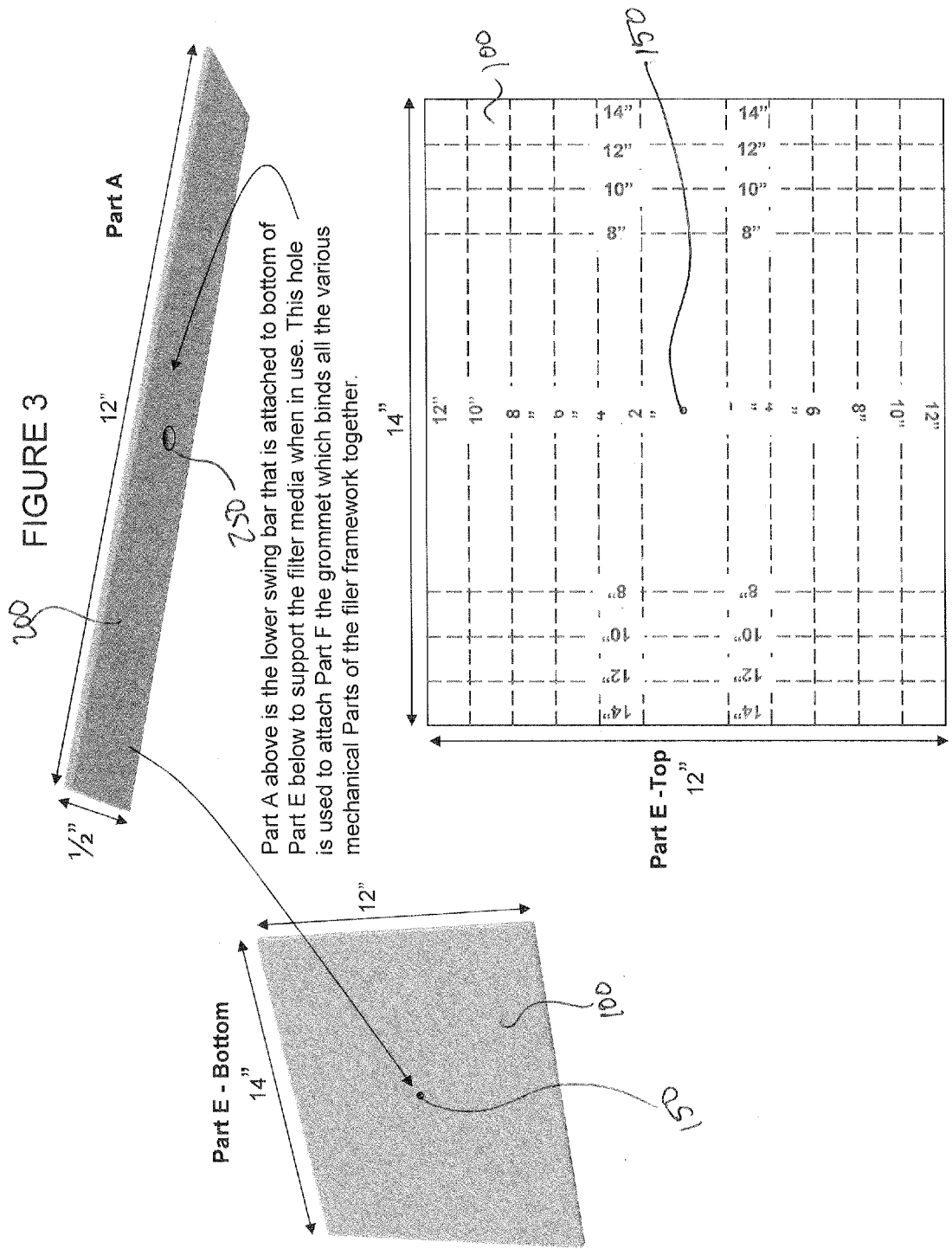

FIG. 3 shows the first structural component 200—Part A, which may be a lower swing bar that is attached to the bottom of the filtration member 100—Part E. The first structural member may swivel to provide support to the framework in either a width W or length L (illustrated best in FIG. 1d) of the vent opening 600. When the first structural component 200 is utilized with the second structural component 300, those two components may provide a criss-crossing framework 50, such that there may be support in both the width and length of the framework 50 to support the filtration member 100. It will be appreciated that Part E may be a separate filtration member 100 and may be made from any filtration media of any size. It will be appreciated that the filter member 100 may be made of varying shapes and sizes without departing from the spirit or scope of the present disclosure. In the top view of Part E, illustrated in FIG. 3, the various duct size markings can be visualized. The duct size markings allow users to trim the filter member 100 to fit various sizes of ventilation ductwork. As illustrated in FIG. 3, Part E may comprise a hole 150, which may be located in the center of the filter member 100, and may be designed to accommodate Part F, which may be a grommet or pin or other attachment mechanism that is configured and dimensioned to tie the different parts of the framework mechanism 50 together. Other components 200, 300 and 400 may also include a similar hole for receiving the grommet or other attachment mechanism and to provide the compression forces necessary to maintain the framework 50 together while in use.

Also illustrated in FIG. 3, is the bottom view of the filtration member 100—Part E, where the hole 150 is illustrated as being centered in the filter media. It will be appreciated that Part A may comprise a hole 250 and may attach to the bottom of the filtration member 100 to form the structural base for the various parts of the filter framework mechanism 50.

Figure 4:
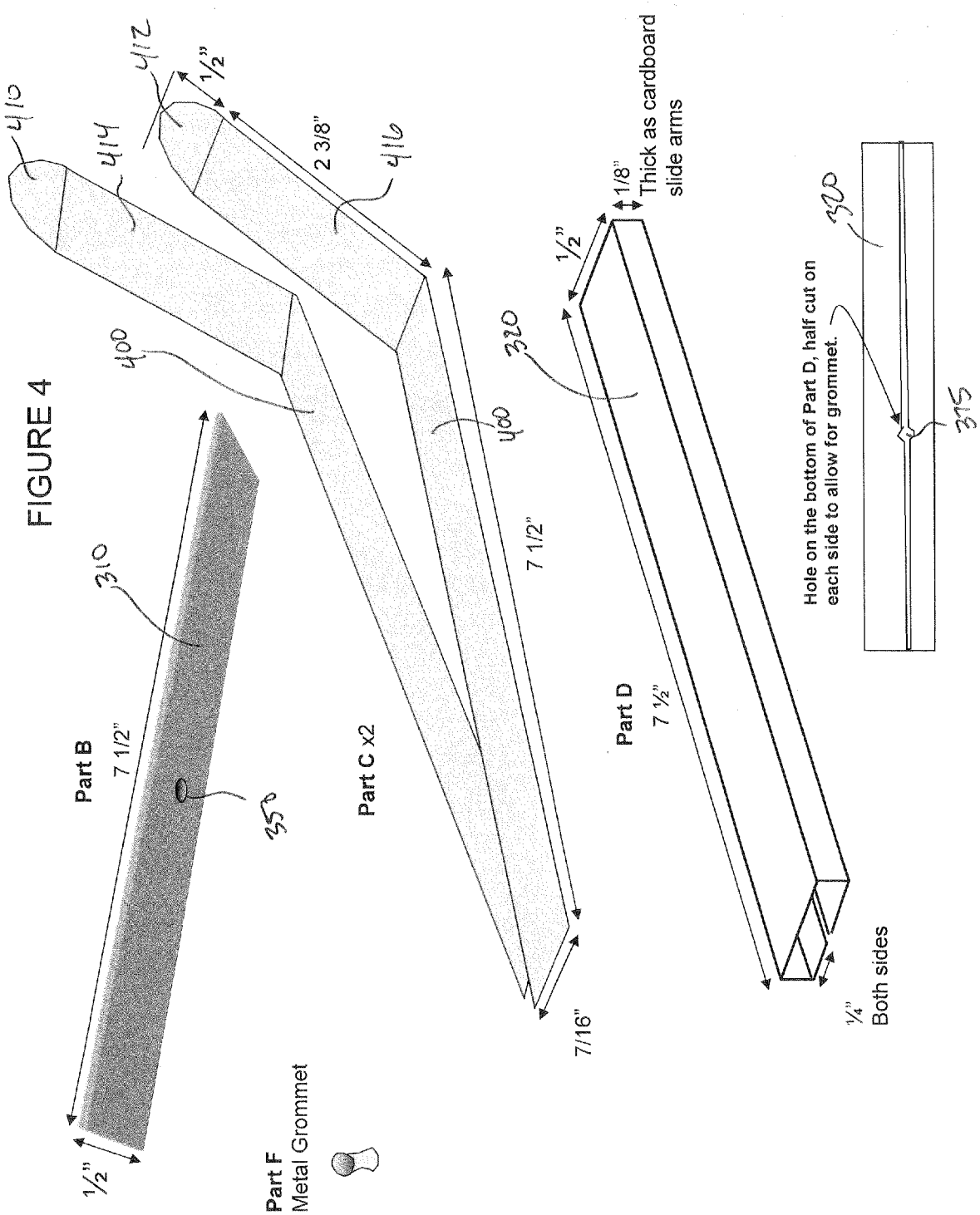

FIG. 4 shows the second structural component, which may be include the upper base part 310 of the filter framework mechanism 50 as well as the box frame 320. The upper base support part 310 may comprise a hole 350 and may be attached to the upper side of the filtration member 100 and may be positioned opposite the first structural member 200. The first structural component 100 and the upper base part 310 form, along with the box frame 320—Part D, the second structural component 300 designed to hold the sliding arms 402, 404. The box frame 320 may include a hole 375 for receiving a grommet or other attachment mechanism. The sliding arms 402, 404 of arm 400 may comprise folding wings 414, 416 that allow for easy adjustment of the framework 50 and air vent filter 100 for use in various sizes of ventilation ductwork. The arm 400 may also comprise end tabs 410, 412 that fold over the edge of the floor, wall or ceiling to hold the entire unit 10 in place during operation.

Figure 5:
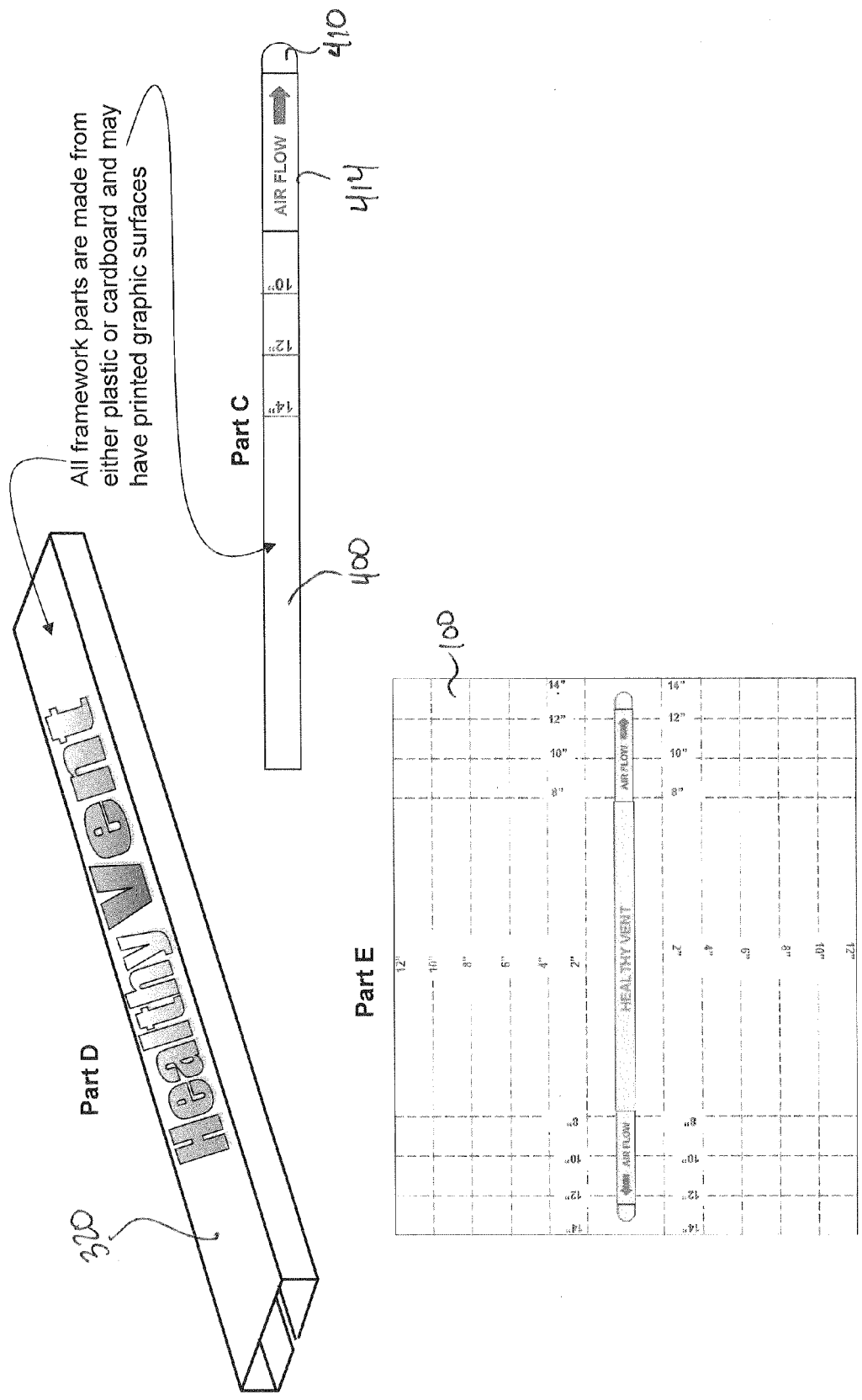

FIG. 5 shows the printed surfaces of Parts E, C and D on the upper face portion of the Air Vent Filter framework.

It will be appreciated that any commercial filter may be used with the filter framework. The filter is configured for collecting dust, allergens, spores, bacteria and other particulate matter from the air entering the room through the ventilation system and is designed to be easily replaced and disposed of as needed.

The optional air freshener contains scented material for freshening the air in the surrounding room and is also designed to be easily replaced as needed. The vent register sleeve framework has an open structure design to allow for easy airflow through the unit with supports on the inside that create open chambers used to hold the air freshener and air particle filter. The open cross supports allow for airflow around and through the scent dispenser and filter media permitting free airflow through the framework sleeve. The passing of forced air over and around the optional scented material will cause the scent vapors to disperse throughout the room.

The air flow over and through the filter material removes undesirable pollutant particles from the air being distributed into the room. The support sides of the vent sleeve framework can rotate outward or slide inside the bottom of the upper portion of the sleeve framework for storage and packaging. The vent sleeve framework may contain two parts that slide into each other to allow adjustment for different sizes of vent duct openings. As the support arms slide out they also bend upwards to create support that holds the framework in place on either side of the filtration media by hanging the entire filtration system just below the register cover by arms that hang on the ridge of the floor, wall or ceiling in which the vent and register resides.

In the foregoing Detailed Description, various features of the disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description by this reference, with each claim standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An assembly of structural components for supporting an air filtration member, comprising:
    an air filtration member that is adjustable in its length and width to fit an air duct opening; and
    a framework designed to provide support to the air filtration member comprising:
        a first structural component that is adjustable in one of its length and width and forming a lower base of the framework for supporting the filtration member;
        a second structural component forming an upper base of the framework for supporting the filtration member; and
        an arm that is slidably adjustable within and attachable to the second structural component and that is configured to provide an adjustment mechanism for the framework, such that said framework and said filtration member can be selectably located within a variety of differently sized forced air heating or air conditioning ducts after adjustment.

2. The assembly of claim 1, wherein the first structural component is attachable to the air filtration member and the second component comprises an upper base support member and a box frame, and wherein the framework is configured and dimensioned as a disposable unit that is located underneath a vent register cover on a floor, wall or ceiling during use in order to provide a disposable air pollution filtration system.

3. The assembly of claim 2, wherein the arm comprises a folding wing that is adjustable so that the framework is useable in differently sized ventilation ducts.

4. The assembly of claim 3, wherein the arm comprises an end tab that extends from the framework and is configured and dimensioned to fit past an edge of a vent register cover and rest on a surface of the floor, wall or ceiling of the building to hold the entire assembly in place during operation, such that the framework is not attached to any mechanical system components in a building.

5. The assembly of claim 4, wherein the framework is attached to a filtration member for insertion into the ventilation ducts below a vent register.

6. The assembly of claim 1, wherein the filtration member is adjustable to fit one or many different sizes of air vent ducts and vent register openings.

7. The assembly of claim 4, wherein the framework is designed to slide laterally to form narrower or wider lengths to support various sizes of filtration members.

8. The assembly of claim 1, wherein the entire filtration and framework assembly is configured and designed to fold flat for shipping and packaging purposes.

9. The assembly of claim 1, wherein the filter member is treated with an electrostatic charge.

10. A framework for providing structural support to a filtration member, comprising:
    a first structural component that is adjustable in one of its length and width and forming a lower base of the framework for supporting the filtration member;
    a second structural component forming an upper base of the framework for supporting the filtration member;
    an arm that is slidably adjustable within and attachable to the framework and that is configured to provide an adjustment mechanism for said framework, such that said framework and said filtration member can be selectably located within a plurality of differently sized forced air heating or air conditioning ducts after adjustment.

11. The framework of claim 10, wherein the first structural component is attachable to the air filtration member and the second component comprises an upper base support member and a box frame, and wherein the first structural component, the second structural component and the arm are configured and dimensioned as a disposable unit that is configured and dimensioned for location underneath a vent register cover on a floor, wall or ceiling during use in order to provide support for a disposable air pollution filtration system.

12. The framework of claim 11, wherein the arm comprises a folding wing that is adjustable so that the framework is useable in differently sized ventilation ducts.

13. The framework of claim 12, wherein the arm comprises an end tab that extends from the first structural component and the second structural component and is configured and dimensioned to fit past an edge of a vent register cover and rest on a surface of the floor, wall or ceiling of the building to hold the framework in place during operation, such that the framework is characterized by not being attached to any mechanical system components in a building.

14. The framework of claim 13, wherein the framework is attached to a filtration member for insertion into the ventilation ducts below a vent register.

15. The framework of claim 10, wherein the filtration member is adjustable to fit one or many different sizes of air vent ducts and vent register openings.

16. The framework of claim 13, wherein the framework is designed to slide laterally to form narrower or wider lengths to support various sizes of filtration members.

17. The framework of claim 10, wherein the framework and a filtration member are configured and designed to fold flat for shipping and packaging purposes.

18. The framework of claim 10, wherein the arm comprises a plurality of arms that are slidable within and attachable to the framework.

19. A method of filtering air in a building, comprising:
    assembling a first structural component as a lower base, a filtration member, a second structural component as an upper base and an arm into a framework;
    adjusting the arm to fit into a vent register opening in a floor, wall or ceiling;
    inserting the framework into the vent register opening in the floor, wall or ceiling;
    attaching the arm to the floor, wall or ceiling, such that the framework provides support for a disposable air pollution filtration system and is located underneath a vent register cover on a floor, wall or ceiling during use.

20. The method of claim 19, wherein the step of attaching the arm further comprises manipulating an end tab that extends from the framework, such that the end tab fits past an edge of a vent register cover and rests on a surface of the floor, wall or ceiling of the building to hold the framework in place during operation, such that the framework is not attached to any mechanical system components in a building.

* * * * *